United States Patent

[11] 3,594,892

| [72] | Inventor | Ross E. Stewart |
| | | Norwalk, Ohio |
| [21] | Appl. No. | 815,931 |
| [22] | Filed | Apr. 14, 1969 |
| [45] | Patented | July 27, 1971 |
| [73] | Assignee | Clevite Corporation |

[54] METHOD OF PRODUCING A MULTIPLE COMPRESSION RATE BUSHING
8 Claims, 12 Drawing Figs.

[52] U.S. Cl. ................................................. 29/451,
29/507, 29/508, 64/11, 267/63, 285/85
[51] Int. Cl. ........................................................ B23p 11/02
[50] Field of Search ........................................... 29/436,
450, 451, 507, 508, 235; 64/11; 267/63; 287/85

[56] References Cited
UNITED STATES PATENTS

| 1,835,575 | 12/1931 | Sanders et al. | 64/11 X |
| 1,888,642 | 11/1932 | Tryon | 29/235 X |
| 1,954,989 | 4/1934 | Eastman | 29/508 U X |
| 2,052,448 | 8/1936 | Colaert | 29/235 X |
| 2,572,215 | 10/1951 | Swart | 29/235 X |
| 3,012,421 | 12/1961 | Cull | 29/508 |

FOREIGN PATENTS

| 1,103,772 | 3/1961 | Germany | 64/11 |

Primary Examiner—Charlie T. Moon
Attorney—Edward E. Sachs

ABSTRACT: A bushing of an inner and an outer tubular sleeve and a rubber insert placed therebetween under radial compression, and in which the outer or the inner tubular sleeve is deformed out of round after assembly of the bushing. The rubber insert may be adhesively secured to the sleeves and/or post-cured prior to the deformation.

PATENTED JUL 27 1971 3,594,892

INVENTOR.
ROSS E. STEWART
BY
ATTORNEY 3,594,892

1

METHOD OF PRODUCING A MULTIPLE COMPRESSION RATE BUSHING

This invention relates generally to rubber bushings and, more particularly, to the method of making a rubber bushing having a multiple spring rate.

Bushings of this type find application in the automotive industry and particularly for suspension systems in which forces of dissimilar magnitude act from different directions. In order to satisfy these requirements it is common in the prior art to form bushings of tubular sleeves with one sleeve arranged within the other and with a rubber insert sandwiched therebetween. Variation in the spring rate of the bushing is obtained by molding the rubber insert with cavities along a particular segment of the bushing to permit, upon the application of a force, the rubber to be displaced into the cavity whereby the spring rate in the region of the cavity is significantly affected. A bushing of this type is disclosed in U.S. Pat. No. 3,147,964.

In practice it has been found, however, that the provision of cavities in the rubber bushing affects the durability of the bushing since the stress imparted to the rubber exceeds at times the stretch capacity of the rubber which then causes a permanent distention of the rubber. Moreover, the spring rate in rubber bushings having cavities frequently changes over a period of time, particularly in automotive applications, as dirt particles and the like enter the cavity and change the volumetric relationship.

It is obvious, of course, that bushings that employ cavities for varying spring rate require special molds and careful attention as to shape and location.

The bushings discussed in the preceding paragraph are presently being successfully employed and are superior to bushings which aim to accomplish the same objective by offsetting the centers of the bushing and the like. The bushings in the latter category are, generally, expensive to manufacture since in most instances special tools, forms, or material must be employed.

It is the primary object of this invention to provide a method of making a multiple compression rate bushing from tubular sleeves utilizing solid rubber inserts in which the spring properties of the bushing are not readily affected by penetration of dirt and the like into the bushing.

It is another object of this invention to provide a method for making a variable spring rate bushing by means of tubular and concentrically arranged sleeves and a solid rubber insert thereby avoiding the pitfalls and disadvantages inherent with prior art devices and methods.

An aspect of the present invention resides in the method of making a multiple compression rate bushing which has an inner and an outer sleeve of rigid material and is formed initially of generally tubular configuration. The method comprises the steps of axially forcing into and radially compressing an annular rubber insert between the aforementioned inner and outer sleeves to establish concentrically juxtaposed sleeves and arranging the insert therebetween for substantially filling the space between the sleeves. Upon assembly, one of the sleeves of the bushing is deformed out of round along the axial lengths of this one sleeve to establish in the rubber insert a multiple rate of radial compression.

For a better understanding of the present invention, together with other and further objects thereof, reference is had to the following description taken in connection with the accompanying drawings, and its scope will be pointed out in the appended claims.

Figure 2:
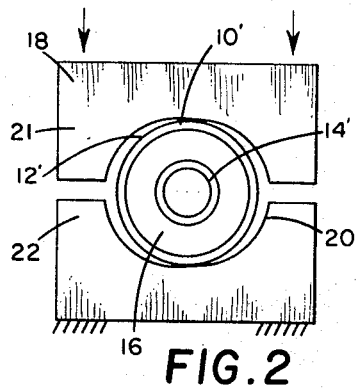
FIG. 2 is a perspective view of an apparatus for deforming the bushing out of round prior to the deformation step.
Figure 3:
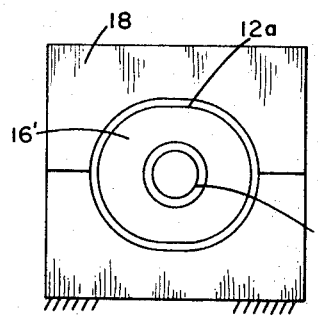
FIG. 3 is a view similar to FIG. 2 showing the apparatus after the deformation step.
Figure 4:
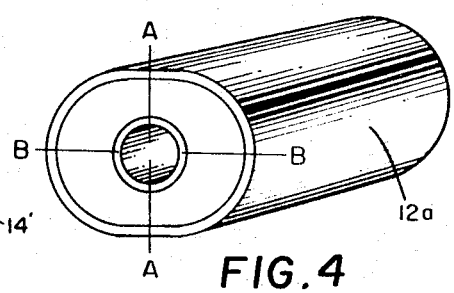
FIG. 4 is a perspective view of a bushing produced in accordance with this invention and in which the outer sleeve is deformed.
Figure 5:
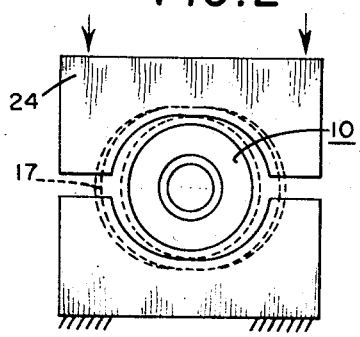
Figure 6:
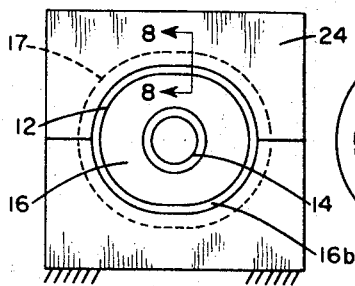
Figure 7:
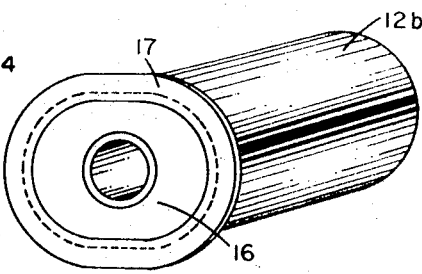
Figure 8:
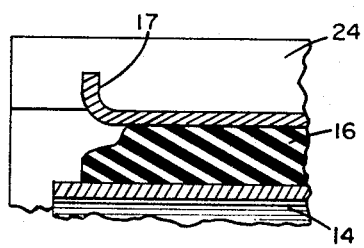
Figures 9, 10:
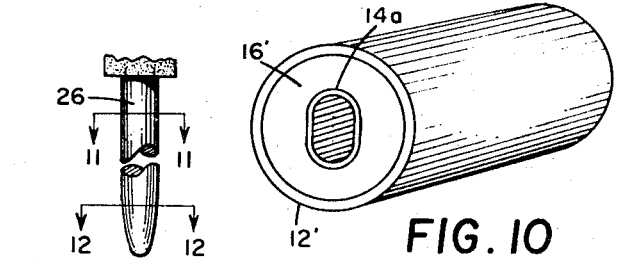

FIGS. 5, 6, and 7 are views similar to FIGS. 2, 3, and 4 respectively, except that these views illustrate a flanged bushing produced in accordance with this invention;

FIG. 8 is a section taken along line 8-8 of FIG. 6;

FIG. 9 is an illustration of a bushing in situ and the apparatus for deforming the inner sleeve;

FIG. 10 is a bushing produced by the apparatus shown in FIG. 9; and

Figure 11:
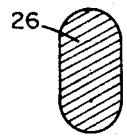
Figure 12:
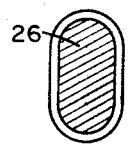

FIGS. 11 and 12 are sections taken along lines 11-11 and 12-12 respectively of the deforming pin shown in FIG. 9 illustrating the cross-sectional configuration thereof.

Figure 1:
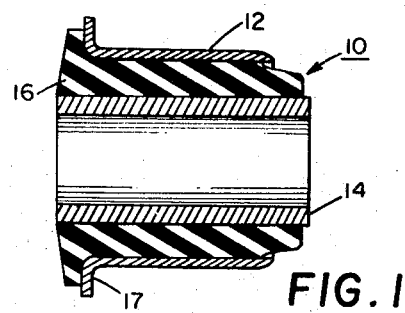
FIG. 1 is an axial cross-sectional view of a bushing of the type herein under consideration.

Turning now to the drawing and particularly to FIG. 1 thereof, there is shown, for exemplary purposes, a longitudinal cross section of a typical bushing 10 comprising a tubular, elongated sleeve 12 formed of material rigid against expansion and contraction, such as steel. Disposed concentrically within the outer sleeve 12 there is arranged an inner rigid sleeve 14 of steel or similar material and a rubber insert 16 also of tubular configuration concentrically disposed between sleeves 12 and 14. The bushing as hereinabove described is known in the art and is assembled as follows.

The rubber insert 16 and more particularly the outer circumferential surfaces thereof are coated with an adhesive material and thereafter the inner sleeve 14 is axially forced into the central opening of the rubber insert 16 until the end surfaces are in substantial juxtaposition. When so assembled, the outside diameter of the rubber insert 16 is greater than the inside diameter of the outer sleeve 12. The rubber insert 16, together with the inner sleeve 14 are then axially forced into the opening of the outer sleeve 12 under substantial radial compression until the end surfaces of all three members are in substantial juxtaposition. The dimensional relationship between rubber insert 16 and outer sleeve 12, as aforementioned, assures a tight fit between the rubber and the latter sleeve and is effective to counteract torque that may develop due to rotary movement of the inner sleeve while the outer sleeve is held substantially stationary. The same effect is of course also obtained when the inner sleeve is maintained stationary and the outer sleeve is caused to rotate. In order to increase the resistance to torque, the layer of adhesive material on the rubber insert bonds the outer and inner surfaces of the rubber insert to the inner and outer surfaces of the two sleeves respectively.

It is of course possible to assemble the parts by coating only the sleeve members 12 and 14 with adhesive matter and thereafter forcing the rubber insert into position. However, it has been found that an adhesive coating on the rubber insert, of a suitable material, acts as a lubricant and facilitates the insertion of the insert into the outer sleeve 12 as well as the insertion of the inner sleeve into the rubber insert.

Alternatively the rubber insert 16 may be first inserted into the tubular sleeve 12 and the inner sleeve 14 is only then forced into the central opening of the rubber insert 16. The resulting bushing 10 may then be post cured at a suitable temperature to further increase the bond between the sleeves and the insert 16. The use of adhesive coatings and/or curing of the rubber, in situ, depends upon the application for which the final bushing is to be employed.

The assembled bushing 10' is then placed into a forming die 18 having an elliptical or oval die configuration as shown at 20 in FIG. 2. Pressure is exerted in the direction of the arrow shown in FIG. 2 until the parts 21 and 22 of die 18 are in abutting position and the die is closed. This results in the deformation of the outer sleeve which now is out of round, see 12a as illustrated in FIG. 3 where the deformed bushing is still in a situ, as well as FIG. 4. By this means an oval or an elliptical configuration may be imparted to the tubular sleeve 12'. The deformation from round to out-of-round (see 12' and 12a) causes a change in the compression of the rubber between the sleeves 14 and 12a. It will be appreciated that the initial diameter of the outer sleeve has been reduced, while the diameter of the outside diameter of the inner sleeve 14 has not changed, so that the rubber, or rubberlike material, of insert 16' located within the region of the minor axis identified as "A-A" in FIG. 4 is substantially and comparatively less than the rubber located in the region along the major axis "B-B", see FIG. 4. The deformation of the outer sleeve 12a thus imparts a differential spring rate to the rubber insert 16'.

Referring now to FIGS. 5 to 8 there is shown a forming die 24 for deforming a flanged outer sleeve 12 in the same manner as above described except that special provision is made in die 24 to receive the flanged portion 17 of outer sleeve 12 within a groove. More specifically, FIG. 5 illustrates the initial tubular configuration of a flanged bushing 10 having a flanged outer sleeve 12 deformed in die 24 to an out-of-round configuration 12b as shown in FIGS. 6 and 7.

In accordance with this invention it is also possible to deform the inner sleeve 14 into an out-of-round shape by forcing a tapered pin 26 as shown in FIG. 9, into a bushing 10' positioned on a stationary support 28. The pin is gradually tapered as exemplified in FIGS. 11 and 12 to gradually perform the deformation of the tubular sleeve 14 into an elliptical or oval configuration as shown at 14a in FIG. 10.

The rubber insert 16 may be cured either before or after the deformation step.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

I claim:

1. A method for producing a multiple compression rate bushing comprising an inner and an outer sleeve of rigid material formed originally of generally cylindrical tubular configuration, the method comprising the steps of:
   axially forcing into and radially compressing an annular, rubber insert between the inner and outer sleeve to establish concentrically juxtaposed sleeves, and arranging the insert therebetween for substantially filling the space between the sleeves;
   deforming one of said sleeves to an oval shape along the axial length of the sleeve to establish in the rubber insert a multiple rate of radial compression.

2. A method according to claim 1, wherein only said inner sleeve is deformed.

3. A method according to claim 1, wherein only said outer sleeve is deformed.

4. A method according to claim 1, wherein the surface of one of said sleeves facing the rubber insert is coated with an adhesive material prior to pressure contact with said insert.

5. A method according to claim 4, wherein said rubber insert, after assembly but prior to the deformation step, is post-cured to create a bond between said insert and said last mentioned sleeve.

6. A method according to claim 4, wherein said rubber insert, after assembly and subsequent to the deformation step, is post-cured to create a bond between said insert and said last mentioned sleeve.

7. A method according to claim 1, wherein said rubber insert is first forced over the inner sleeve and subsequently radially compressed into said outer sleeve.

8. A method according to claim 1, wherein the outer sleeve and the rubber insert is deformed to an elliptical or oval configuration and the radial rate of compression of the assembled bushing is lowest at the maximum diameter and highest at the smallest diameter.